Feb. 15, 1938.  A. MOISY  2,108,384
TRANSMISSION GEAR FOR ELECTRIC STARTERS
Filed April 22, 1937
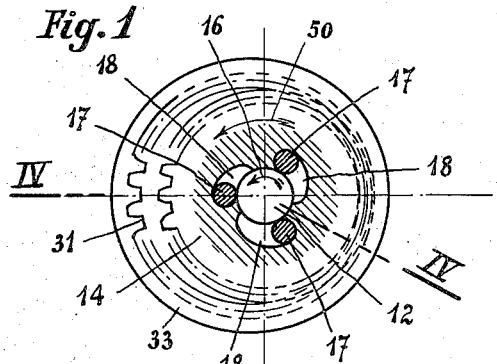
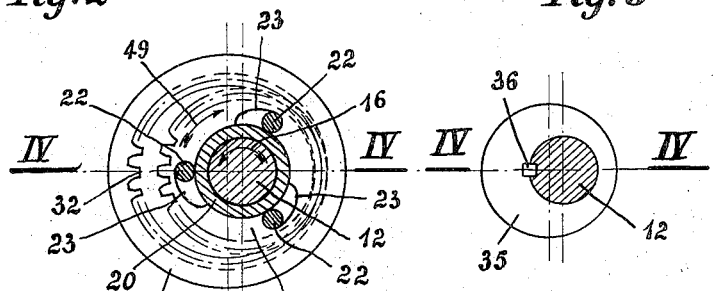
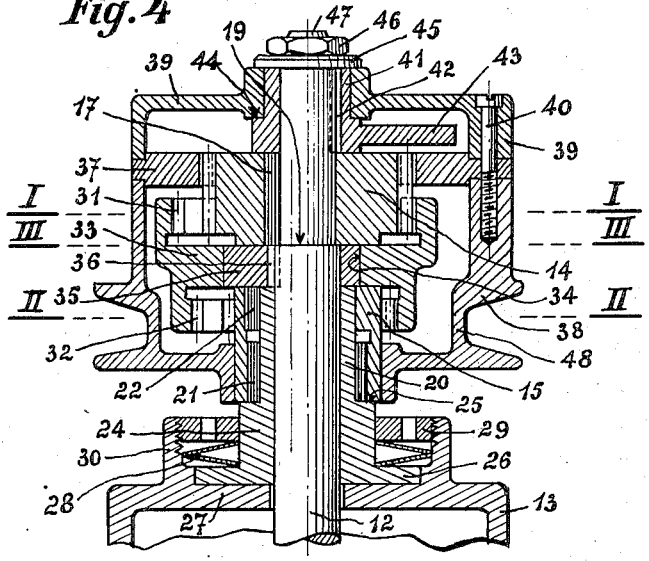
A. Moisy
INVENTOR
By Glascock Downing & Seebold
Attys.

Patented Feb. 15, 1938

2,108,384

UNITED STATES PATENT OFFICE 2,108,384

TRANSMISSION GEAR FOR ELECTRIC STARTERS

Alexandre Moisy, St.-Prix, France

Application April 22, 1937, Serial No. 138,449
In France November 19, 1936

8 Claims. (Cl. 74—6)

The reduction gear which is the object of the invention is applicable to electric-starters for starting explosion and internal combustion engines.

An object of the invention is to afford an automatic change-over of gear ratio according to whether a motor-generator is in use as a starter or a generator. A further object is to provide a slipping device limiting the transmissable couple and thereby safeguarding against back-fires or like excessive changes of load. A third object is to provide an automatic change-over of gear ratio in transmission between a motor-generator and an engine which can be built as a compact, robust and enclosed unit.

Another object is to provide such a device, in a form which is suitable for building on to the motor-generator without excessive shaft overhang and with any ordinary transmission means such as a belt.

The invention consists in that two pinions of different diameter externally toothed and centred with free-wheel and braked on the motor shaft, the larger directly and in such a manner as to be able to turn freely in the sense opposite to the sense of rotation of this shaft, the lesser indirectly and so as to be able to turn freely in the same sense of rotation as the shaft, on a sleeve itself centred on this shaft and friction-coupled with a part fixed with reference to the shaft, these two pinions being engaged together, the larger, which entrains the reduced speed shaft with which it may be coupled directly or indirectly, with the larger and the smaller with the lesser of two internal coaxial teeth of a double-internally toothed pinion, which is engaged on an eccentric coaxial with its teeth and keyed on the motor shaft.

The large pinion may be formed or fixed solid on the shaft entrained at reduced speed.

A balancing counter-weight diametrically opposed to the eccentric of the motor shaft may be keyed on the latter.

The large pinion may be fixed to a casing enclosing the mechanism and forming an organ of transmission or coupling to the shaft entrained at reduced speed.

The fixing of the large pinion to the casing may advantageously be effected by the engagement of a boss of this pinion in a hole made as necessary in a partition fixed in the casing between it and its covering.

The casing may carry a tooth or a groove externally to form an engagement or groove pulley.

The sleeve interposed between the motor shaft and the small pinion may be prolonged into the casing of the dynamo where it is submitted to the action of a brake spring. This sleeve may carry in the dynamo casing a collar thrust on a fixed piece by a spring pressing on it in a manner adjustable by means of a screw cover.

In order to appreciate these points, the annexed drawing represents schematically one example of realization of the invention:

Figure 1 is a partial section on the line I—I of Figure 4;

Figure 2 is a schematic section on the line II—II of Figure 4.

Figure 3 is a schematic section on the line III—III of Figure 4.

Figure 4 is an axial section on the line IV—IV of Figures 1, 2 and 3.

On the shaft 12 of the starter motor-generator of which the casing is indicated at 13, are centred the two externally toothed pinions 14 and 15.

The pinion 14 is larger than the pinion 15 and is mounted directly on the shaft 12 and may turn freely on shaft 12 in the sense opposite to the sense of rotation of the said shaft 12 which is indicated by the arrows 16 in Figures 1 and 2. However, in the sense of rotation of the shaft 12 the rotation of the pinion 14 is prevented by a free-wheel formed by wedge rollers 17 engaged in ramped slots 18. The pinion 14 abuts against a shoulder 19 of the shaft 12.

The pinion 15 is carried indirectly on the shaft 12 by the intermediary of a cylindrical sleeve 20 on which it is engaged, and which is itself mounted on the shaft 12. This pinion 15 is provided with a needle roller bearing 21 so as to turn freely on the sleeve 20 in the sense of rotation of the shaft 12 indicated by the arrow 16 in Figures 1 and 2 but its relative rotation in reverse sense is prevented by the wedge rollers 22 engaged in the ramped slots 23.

The sleeve 20 has a thicker part 24 forming a shoulder 25 for the pinion 15, and this part 24 is provided at its free extremity with a flat flange 26 presenting a face axially endwise. This collar 26 is held between a friction surface 27 forming part of the casing 13 of the dynamo and a spring 28 formed of two Belleville washers mutually compressed in adjustable manner by the ring 29 screwed into the fixed housing 30 formed coaxially with the shaft 12, on the casing 13. There is thereby obtained between the sleeve 20 and the casing 13 a limitation of couple, by which the force of the spring 28 is sufficient to prevent the sleeve 20 from turning with the shaft 12 and more than sufficient to compensate for the difference of mechanical advantage between the pinions 14 and 15, so as to give the pinion 15 a differential action preponderating over that of the pinion 14 when this pinion 15 drags on the sleeve 20.

The pinions 14 and 15 are engaged with the internal tooth rings 31 and 32 respectively, of a double internally toothed pinion 33 of which the teeth are coaxial with a bore 34 formed in this double pinion and borne on an eccentric 35 keyed on the shaft 12 by a key 36.

The pinion 15 is located axially on the shaft 12 one way by the shoulder 25, and the other way by the eccentric 35.

Towards one end of it the pinion 14 is engaged in a circular plate 27 in a complementarily formed opening in this plate, which plate is retained between the casing 38 and its cover 39 fixed by means of screws 40 (of which only one is shown), so that the pinion 14 cannot rotate except with the plate 37 and casing 38.

In opposition to the shoulder 19 of the shaft 12 on which it is carried, the pinion 14 is retained and located by the sleeve 41 which is keyed on the shaft 12 by a key 42 and which carries, diametrically opposed to the eccentric 35 a balancing counter-weight 43. This sleeve 41 is itself retained by its shoulder 44 against the cover 39 of the casing 38, and the casing and cover are retained on the shaft 12, with the mechanism which they enclose, by a washer 45 fixed by the nut 46 screwed on the threaded extremity 47 of the shaft 12.

The casing 38 is formed with a V-belt groove 48 coaxial with the shaft 12 and intended to receive and engage a truncated V-sectional belt (not shown) coupling the casing to the shaft of the motor to be started.

The operation is as follows:

Upon putting the starter into motion as a motor the shaft 12 is rotated in the sense of the arrow 16 whilst the casing 38 is connected by the belt with the shaft of the motor to be started. The shaft 12 rotates with itself the eccentric 35 which carries with it in the same direction the double pinion 33, engaging the pinions 14 and 15. The pinion 14 being locked in the casing 38 by the plate 37, the double pinion 33 causes the pinion 15 to turn in the sense indicated in Figure 2 by the arrow 49, in which sense the rollers 22 wedge between sleeves 20 and the ramps 23, up to the point where this pinion 15 is arrested upon the sleeve 20. At this moment the double pinion 33, continuing to be rotated with the shaft 12 by the eccentric 35, but finding resistance by the pinion 15, wedged on the sleeve 20 which is braked by the spring 28, turns with it, in the sense of the arrow 50 (Figure 1) the pinion 14 and the casing 38 solid therewith. This movement is one of reduction according to the function of the number of teeth of the pinions 14 and 15. Once the combustion motor is started and the circuit on the electric starter opened, the motor drives the shaft 12 in the same sense (arrows 16 and 50), through the intermediary of the casing 38 and the pinion 14; this pinion 14 transmitting to the shaft 12 by the rollers 17. With it rotates the double pinion 33 which entrains the pinion 15 and turns it idly on the sleeve 20 by reason of the free wheel action of the rollers 22 in the sense of rotation. The starter thereupon operates as a generator.

In the case of a back-fire or the like of the motor to be started the couple limitation device, which the sleeve 20 affords by virtue of its part 24 and collar 26 braked by the springs 28, slips frictionally and avoids breakage of the gear.

It is conceived that the invention is not limited to the form of execution described and shown but extends to the numerous variations of construction which may be imported into an arrangement of this kind.

What I claim is:—

1. A transmission device for changing a gear ratio according to whether a motor generator is in use as an engine starter or as a generator, comprising a first externally toothed pinion with unidirectional connection to the motor shaft, a sleeve borne on the motor shaft, a second externally toothed pinion unidirectionally connected to said sleeve, friction means for resisting rotation of said sleeve, a double diameter internally toothed pinion mounted eccentrically of said first and second pinions so as to engage both, and a driving connection between said first pinion and the engine to be started.

2. A device according to claim 1 in which unidirectional connection is by roller and wedge-surface means.

3. A transmission device for changing a gear ratio according to whether a motor generator is in use as an engine starter or as a generator, comprising a rotary casing, a first externally toothed pinion, a driving connection between said pinion and said casing, a unidirectional connection between said pinion and the motor shaft, a sleeve borne on the motor shaft, a second externally toothed pinion unidirectionally connected to said sleeve, friction means for resisting rotation of said sleeve, a double diameter internally toothed pinion mounted eccentrically of said first and second pinions so as to engage both and a driving connection between said casing and the engine to be started.

4. A device according to claim 3 in which said casing is provided with external means for transmission to the engine.

5. A device according to claim 3 in which said casing is provided with an external pulley groove coaxial with the motor shaft.

6. A device according to claim 3 wherein said casing is borne coaxially on the motor shaft and encloses the gear mechanism.

7. A transmission device for changing a gear ratio according to whether a motor generator is in use as an engine starter or as a generator, comprising a rotary casing, a first externally toothed pinion, a driving connection between said pinion and said casing, a unidirectional connection between said pinion and the motor shaft, a sleeve borne on the motor shaft, a second externally toothed pinion unidirectionally connected to said sleeve, friction means externally to said casing for resisting rotation of said sleeve and comprising a resilient rigid friction brake, a double diameter internally toothed pinion mounted eccentrically of said first and second pinions so as to engage both, and a driving connection between said casing and the engine to be started.

8. A transmission device for changing a gear ratio according to whether a motor generator is in use as an engine starter or as a generator, comprising a first externally toothed pinion with unidirectional connection to the motor shaft, a sleeve borne on the motor shaft, a second externally toothed pinion unidirectionally connected to said sleeve, friction means for resisting rotation of said sleeve, a double diameter internally toothed pinion mounted on an eccentric of the motor shaft eccentrically of said first and second pinions so as to engage both, a driving connection between said first pinion and the engine to be started and a balance weight fastened to the motor shaft and disposed to one side of said eccentric pinion.

ALEXANDRE MOISY.